July 27, 1965  E. T. GETZ ETAL  3,196,702
PULLEY APPARATUS

Filed Sept. 10, 1963  2 Sheets-Sheet 1

INVENTOR.
E. T. GETZ
M. PACAK
BY
ATTORNEY

July 27, 1965

E. T. GETZ ETAL 3,196,702

PULLEY APPARATUS

Filed Sept. 10, 1963

INVENTOR.
E. T. GETZ
M. PACAK
BY

ATTORNEY

United States Patent Office 3,196,702
Patented July 27, 1965

3,196,702
PULLEY APPARATUS
Edward T. Getz, Cleveland Heights, and Matthew Pacak, Solon, Ohio, assignors to Eaton Manufacturing Company, Cleveland, Ohio, a corporation of Ohio
Filed Sept. 10, 1963, Ser. No. 307,983
12 Claims. (Cl. 74—230.17)

This application is a continuation-in-part of our prior application, Serial No. 164,514, filed January 5, 1962, now Patent No. 3,118,312, and entitled "Pulley Device."

The present invention relates, generally, to torque transmitting devices of the pulley type.

More specifically, this invention relates to self-compensating torque transmitting pulley apparatus that is so constituted and arranged as to automatically adjust for slippage occurring between the sheave halves thereof and driving means engageable therewith, such slippage being due to increased loads imposed upon the apparatus during operation.

Heretofore, numerous self-compensating pulley apparatus have been suggested which utilize the basic principle of providing control means cooperable with the pulley. The control means, upon response to slippage or drag occurring at increased loads on the pulley, will reduce the distance between the sheave halves in an effort to increase the working or effective pitch diameter of the pulley. Accordingly, the control means relieves the slack in the belt or similar driving means passing between the sheave halves. The particular application of a self-compensating pulley is particularly desirable in situations where it is necessary to take up slack or slippage in belt-type driving means extending between the sheave halves. When the use of a flexible belt as driving means is extensive and variations in loads are continuous, stretching or similar permanent deformation of the belt will occur. As a result, the overall length of the belt is increased reducing tension therein and, accordingly, slippage between the sheave halves is suffered, thereby reducing the load-carrying capabilities of the pulley.

Accordingly, while one of the primary objects of the present invention is to provide self-compensating torque transmitting pulley apparatus that is so constituted and arranged as to overcome any and all of the above-mentioned disadvantages of heretofore suggested self-compensating pulley apparatus, it is to be understood that a more specific primary object of this invention is to provide a self-compensating torque-transmitting device of the pulley-type that is so constituted and arranged as to unusually efficiently automatically compensate for lengthening of belt-type drive means.

A further primary object of this invention is to provide self-compensating torque transmitting pulley apparatus comprising compensating means that is so constituted and arranged as to unusually efficiently automatically compensate for lengthening of belt-type driving means.

Another primary object of the present invention is to provide self-compensating torque-transmitting pulley apparatus comprising compensating means that is so constituted and arranged as to unusually efficiently automatically compensate for lengthening of belt-type driving means, said compensating means being disposed radially of the hub of the pulley apparatus and completely axially and annularly encompossing at least a portion of each of a plurality of sheave halves, to enable any forces directly or indirectly imposed upon the compensating means to be unusually efficiently transmitted to and distributed amongst the various component parts of the pulley apparatus.

A still further primary object of this invention is to provide self-compensating torque transmitting pulley apparatus comprising compensating means that is so constituted and arranged as to unusually efficiently automatically compensate for lengthening of belt-type driving means with the compensating means comprising a plurality of inserts, each of which is mutually cooperatively engageable and structurally operatively associated with a corresponding one of a plurality of sheave halves, in a suitable manner, as by a process of molding one with respect to the other, thereby disposing the inserts radially of the hub of the pulley apparatus and completely axially and annularly encompassing at least a substantial portion of each of the sheave halves, to enable any forces directly or indirectly imposed upon the inserts to be unusually efficiently transmitted to and distributed amongst the various component parts of the pulley apparatus.

Furthermore, it is a primary object of this invention to provide a self-compensating torque transmitting device of the pulley type that is readily fabricated of a plurality of parts of any suitable material, such as any suitable plasticized material, and is so constituted and arranged as to possess substantial structural ability under conditions of variable loading and to be unusually efficient in operation.

Other objects and important features of the invention will be apparent from a study of the specification following taken with the drawing, which together show, illustrate, describe and disclose a preferred embodiment or modification of the invention what is now considered to be the best mode of practicing the principles thereof. Other embodiments or modifications may be suggested to those having the benefit of the teachings herein, and such other embodiments or modifications are intended to be reserved especially as they fall within the scope and spirit of the subjoined claims.

Figure 1:
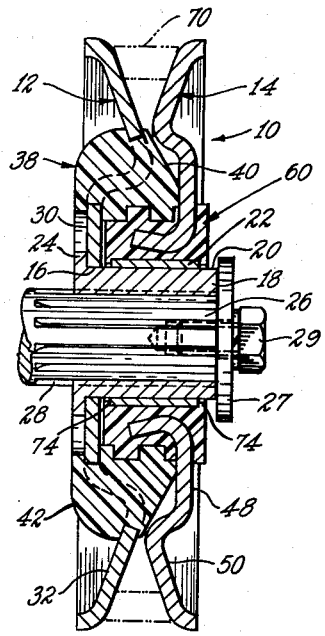
FIGURE 1 is a sectional view of self-compensating torque transmitting pulley apparatus, constructed in accordance with the present invention.
Figure 2:
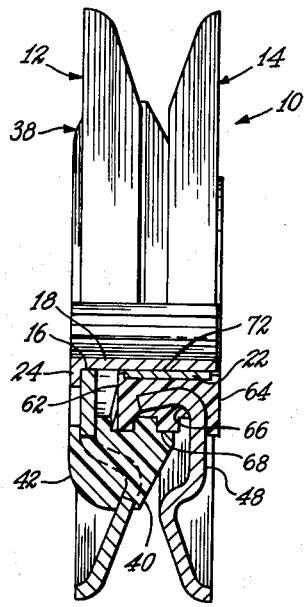
FIGURE 2 is an elevational view, partially in section, of the apparatus illustrated in FIGURE 1.

Attention is now directed to FIGURES 1 and 2 of the drawing wherein there is illustrated a self-compensating or automatically compensating torque transmitting pulley apparatus 10 which is constructed in accordance with the present invention and which comprises a plurality of sheave halves 12 and 14.

The sheave half 12 is provided with a generally centrally disposed annular or circular opening or aperture 16. An axially extending annular or generally cylindrical hub portion 18 is disposed within the opening 16 and non-rotatably secured therein with respect to the sheave half 12 in any suitable manner, as by press-fitting, staking, or any other suitable operation. The hub portion 18 has a bearing surface 20 extending completely annularly about the external or exterior periphery thereof with the bearing surface 20 being rotatably mutually cooperatively engageable with an annular or generally cylindrical bushing 22. The bushing 22 completely annularly encompasses the hub portion 18 substantially throughout the full longitudinal dimensional extent thereof in order to define a substantial bearing surface therebetween.

The hub portion 18 comprises a radially outwardly extending generally annular flange portion 24 at one end thereof that is mutually cooperatively engageable with a portion of the sheave half 12 in order to predetermine the position of the sheave half 12 with respect to the hub portion 18. In addition to being generally cylindrical, the hub portion 18 is of tubular configuration and non-rotatably structurally operatively associated with a shaft 26. To this end, the hub portion 18 and the shaft 26 are each provided with splines 28 with the hub portion 18 positioned with respect to the end of the shaft 26 by any conventional means, such as washer 27 and retaining bolt 29. It is to be understood, however, that any other suitable means for non-rotatably connecting the hub portion 18 to the shaft 26 may be used, such as a key arrangement or press fit. A further function of washer 27 is to limit axial movement of sheave half 14 with respect to sheave half 12, as will become more clear hereinafter. The shaft 26 provides a power input for the apparatus 10, as by means of a suitable motor of conventional construction (not shown), or may provide a power output from the apparatus 10 to any desired location of use (also not shown).

Figure 3:
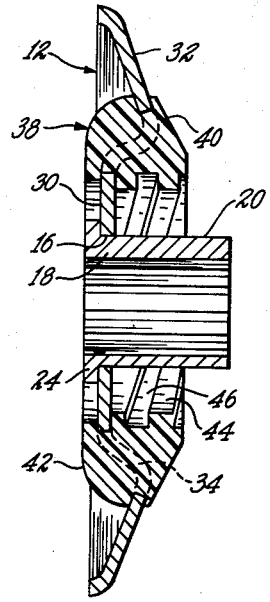
FIGURE 3 is a sectional detailed view of certain component parts of the apparatus illustrated in FIGURES 1 and 2.
Figure 5:
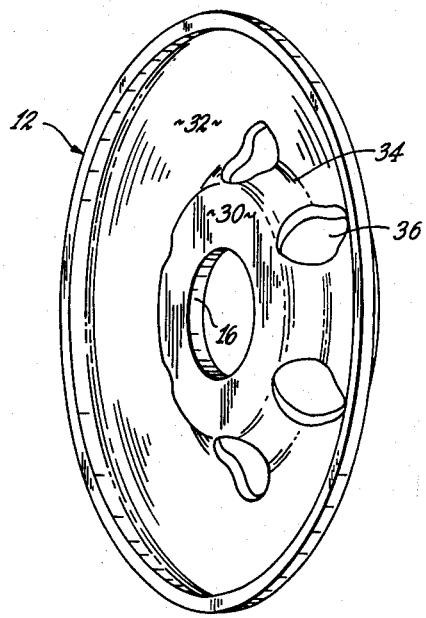
FIGURE 5 is a perspective view of the sheave half illustrated in FIGURE 4.
Figure 4:
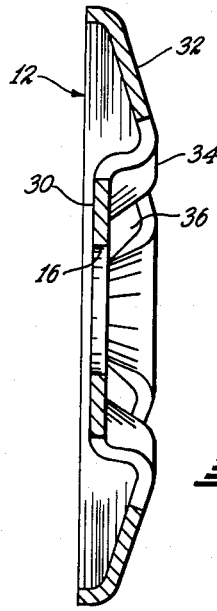
FIGURE 4 is a detailed view, partially in elevation and partially in section, of one sheave halve of the apparatus illustrated in FIGURES 1 and 2.

With particular reference now to FIGURES 3 to 5 of the drawing, it will be seen that the sheave half 12 is of generally annular or substantially circular configuration and further comprises a generally centrally disposed first planar portion 30 and another, or second or angular planar portion 32. The second planar portion 32 is angularly disposed with respect to the first planar portion 30 and positioned radially outwardly thereof. The angle defined between each of the planar portions 30 and 32 is less than 45° and is preferably of the order of approximately 20°. The planar portions 30 and 32 are integrally connected to each other by a curvilinear rib 34 positioned and extending between the planar portions and integrally connected thereto. The rib 34 has slots or openings 36 extending therethrough in circumferentially spaced relationship thereabout, with the slots 36 being radially outwardly disposed relative to the opening 16.

With particular reference to FIGURE 3, it will be seen that an insert 38 is non-rotatably mutually cooperatively engageable and structurally operatively associated with the sheave half 12. The insert 38 may be fabricated of any suitable material, such as a plastic, and preferably is fabricated of nylon. In this manner, the insert 38 can be subjected to a suitable molding process so that the portions of the plasticized or synthetic material of the insert flows through the slots 36 of the sheave half 12. It should also be understood that a tab means (not shown) could be angularly disposed to the sheave half adjacent the slots to aid in holding the insert to the sheave half in direction normal to the pulley axis, as will become clear hereinafter. Accordingly, it should be understood that the insert 38 is comprised of a front face 40 and a rear face 42 angularly disposed with respect to the front face 40, the angular extent of which should be less than 45° and preferably of the order of approximately 30°. Thus, the insert 38 is formed on both sides of the sheave half 12. Stated in other words, the insert 38 completely encompasses a substantial portion of the sheave half 12 axially thereof, that is, in a direction axially of the sheave half or along the longitudinal axis of the hub portion 18; radially thereof, that is, in a direction generally perpendicularly disposed with respect to the aforementioned axis, and completely annularly thereabout. In accordance with this construction, the insert 38 is rigidly keyed, that is, mutually cooperatively engageable and structurally operatively associated, to the sheave half 12 for conjoint rotation therewith.

The insert 38 is further provided with a generally centrally disposed bore 44 which extends completely therethrough and the bore 44 may have an interiorly threaded portion 46 for a purpose to be described hereinafter.

Figure 6:
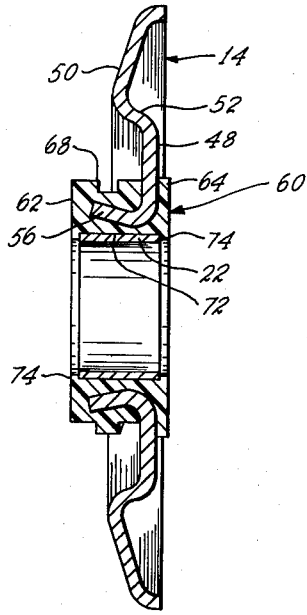
FIGURE 6 is a detailed sectional view of certain other component parts of the apparatus illustrated in FIGURES 1 and 2.
Figure 7:
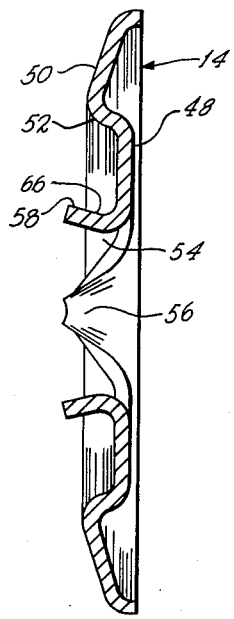
FIGURE 7 is a detailed view, partially in section and partially in elevation, of another of the sheave halves of the apparatus illustrated in FIGURES 1 and 2.
Figure 8:
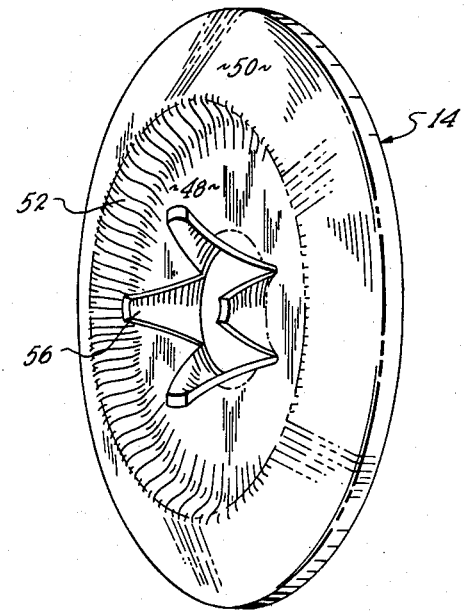
FIGURE 8 is a perspective view of the other sheave half illustrated in FIGURE 7.

With particular reference now to FIGURES 6 to 8 of the drawing, the sheave half 14 comprises a first planar portion 48 disposed generally centrally thereof, a second, or other or angular planar portion 50 angularly disposed with respect to the first planar portion 48, and an imperforate rib 52 positioned and extending between the planar portions 48 and 50 and integrally connected thereto, thereby integrally connecting the planar portions 48 and 50 to each other. The angular extent between the planar portions 48 and 50 is less than 45° and, preferably, is of the order of approximately 20°. In fabricating the sheave half 14, the same is provided with radially outwardly extending slots 54 spaced circumferentially of the planar portion 48 and disposed generally centrally thereof. The material between the slots 54 comprises tab members or tabs 56, which are bent, folded or otherwise formed outwardly of the plane of the planar portion 48 to such an extent as to be acutely angularly disposed with respect thereto. As a result of the actue angular disposition of the tabs 56 with respect to the planar portion 48, there is thus provided an additional completely annular surface 58 for reasons that will be described and disclosed hereinafter.

With particular reference now to FIGURE 6, it will be seen that an insert 60 is provided which is non-rotatably mutually cooperatively engageable and structurally operatively associated with the sheave half 14. The insert 60 may be fabricated of any suitable material, such as a plastic, and preferably is fabricated of nylon, as is the insert 38. In this manner, the insert 60 may be subjected to a suitable molding process to enable portions of the plasticized or synthetic material from which the insert 60 is fabricated to flow through the slots 54 and the opening disposed centrally of the sheave half 14 formed as a result of bending the tabs 56 outwardly thereof.

It will be understood that the insert 60, therefore, comprises a front face 62 and a rear face 64 disposed in generally parallel relationship with respect to the front 62, so that the insert 60 is formed on both sides of the sheave half 14. Stated in other words, the insert 60 completely encompasses a substantial portion of the sheave half 14 axially thereof, that is, in a direction axially of the sheave half 14 or along the longitudinal axis of the hub portion 18; radially thereof, that is, in a direction generally perpendicularly disposed with respect to the aforementioned axis, and completely annularly thereabout. In accordance with this construction, the insert 60 is rigidly keyed, that is, mutually cooperatively engageable and structurally operatively associated, to the sheave half 14 for conjoint rotation therewith. Relative movement between the inert 60 and the sheave half 14 is precluded since cooling the material from which the insert 60 is formed subsequent to forming the insert 60 upon the sheave half shrinks the same, resulting in a good snug fit in an area 66 of the curvature of the tabs 56.

The insert 60 may further be provided with an exteriorly threaded portion 68 that extends completely annularly about the periphery thereof. The thread portion 68 is mutually cooperatively engageable with the thread portion 46 of the insert 38, as will be more fully described and disclosed hereinafter.

As pointed out above, each of the inserts 38 and 60 preferably are fabricated of nylon, and are subjected to a molding process to rigidly key them to the corresponding sheave halves 12 and 14. It is to be understood, however, that any suitable material may be used in fabricating the inserts 38 and 60. In determining the most suitable insert material for the instant application of the novel inventive concept, the characteristics of bearing quality wherein a low coefficient of friction is desirable; resiliency, reasonable dimensional stability, strength and the adaptability to be molded are to be taken into consideration. Of particular significance, a resilient material having a low coefficient of friction and presenting self-lubricating characteristics, thus being capable of functioning as a bearing surface, is preferred. Expecially is such a material preferred in that inconsistent loading on a pulley structure results in considerable strain on the cooperating parts performing the self-compensating function, thereby tending to produce excessive noise. The resilient nature of a plasticized material, such as nylon, suffices to provide a damping effect in the self-compensating unit and results in a comparatively noiseless pulley operation.

The sheave halves 12 and 14 may be fabricated of any suitable material and in any suitable manner. For example, the sheave halves 12 and 14 may be fabricated by means of a suitable stamping process and of a material similar to the material from which the inserts 38 and 60 are fabricated, in which case the stamping process will utilize heat. When the sheave halves 12 and 14 are operatively associated with each other, as illustrated in FIGURES 1 and 2, the planar portions 30 and 48, respectivley, are disposed in generally parallel relationship relative to each other. As a result, the angular planar portions 32 and 50, respectively, form a V-shaped groove completely annularly about the apparatus 10, within which a belt, or other similar drive means 70 may be disposed. Since, as pointed out above, the angular extent of the planar portions 32 and 50, with respect to the planar portions 30 and 48, respectively, is of the order of approximately 20°, it will be seen that the angular extent of the V-shaped groove is of the order of approximately 40°. It has been determined that a V-shaped groove having an angular extent of the order of 36° provides optimum results.

As pointed out above, the bushing 22 completely annularly encompasses the hub portion 18. More specifically, the bushing 22 is rotatably mutually cooperatively engageable with the hub portion 18 and, to this end, the bushing 22 is non-rotatably secured to the insert 60, as by means of a press-fit within a bore 72, disposed generally centrally of the insert 60 and extending therethrough. Further, bushing 22 is retained with respect to insert 60 against axial movement by lip portions 74 on the insert overlapping the ends of the bushing. It should also be noted, bushing 22 could be non-rotatably secured within bore 72 by providing a plurality of circumferentially spaced axially extending grooves or recesses (not shown) in the outer periphery of the bushing. Thus, the sheave half 12, in view of the non-rotatable engagement with the hub portion 18, is rotatable with respect to the sheave half 14, in view of the latter's non-rotatable engagement with the bushing 22 and the rotatable relationship between the bushing 22 and the hub portion 18. And, in addition to the rotatable relationship between the sheave halves 12 and 14, the same are axially movable with respect to each other, in view of the mutual cooperative engagement between the thread portions 46 and 68, respectively.

In the operation of the apparatus 10, the inserts 38 and 60 together comprise self-compensating or automatic compensating means for maintaining proper tension in the drive means 70. Loss or lack of tension in the drive means 70 is induced due to the lengthening thereof during periods of extended usage. This loss of tension produces slack in the drive means 70 which, in turn, results in slippage of the drive means 70 across the surface of the angular planar portion 32 of the sheave half 12. Slippage between the drive means 70 and the sheave half 12 occurs since the frictional force therebetween is overcome by the non-rotatable relationship between the sheave half 12 and the shaft 26 by means of the hub portion 18. However, the sheave half 14 is rotatable with respect to the shaft 26, by means of the bushing 22, and the frictional force between the drive means 70 and the sheave half 14 precludes slippage therebetween. Movement of the sheave half 14 with the drive means 70 and the mutual cooperative engagement of the thread portions 46 and 68 causes relative rotation between the sheave halves 12–14 and axial movement thereof in a direction towards each other. The effective diameter of the apparatus or pulley 10 is thus increased maintaining proper tension in the drive means 70 by unusually efficiently eliminating any slack therein.

In addition, the particular manner in which the inserts 38 and 60 are rigidly keyed to the sheave halves 12 and 14, respectively, and the disposition of the inserts on either side of the sheave halves, substantially strengthens each of the inserts 38 and 60 and the corresponding sheave halves 12 and 14. With particular regard to the sheave half 14, as pointed out above, the tabs 56 are angularly disposed with respect to the planar portion 48. This significant construction presents the additional completely annular surface 58 for transmiting and distributing both radial and axial forces that come to bear directly or indirectly thereagainst to other component parts of the pulley 10, including the sheave half 14. Thus, any forces imposed upon the sheave halves 12 and 14 and the inserts 38 and 60, either directly or indirectly, by the drive means 70, are effectively, efficiently, readily and easily transmitted to and distributed amongst various component parts of the pulley 10. In accordance with the above, a pulley or apparatus 10 constructed in accordance with the present invention presents substantial structural ability towards unusually efficient operation under conditions of variable loading over extended periods of use.

While the invention has been shown, illustrated, described and disclosed in terms of an embodiment or modification which it has assumed in practice, the scope of the invention should not be deemed to be limited by the precise embodiment or modification herein shown, illustrated, described or disclosed, such other embodiments or modifications intended to be reserved especially as they fall within the scope of the claims here appended.

What we claim as our invention is:

1. A self-compensating torque transmitting pulley apparatus comprising, in combination:

a plurality of sheaves halves;
  one of said sheave halves comprising,
  a generally centrally disposed planar portion having an aperture disposed generally centrally thereof and extending therethrough,
  an angular planar portion acutely angularly disposed with respect to said central planar portion and positioned radially outwardly thereof,
  a curvilinear rib positioned and extending between said planar portions and being integrally connected respectively thereto, said rib having:
  slots extending therethrough and being circumferentially spaced thereabout, said slots being radially outwardly disposed of said aperture, and
  an insert non-rotatably mutually cooperatively engageable and structurally operatively associated with said one sheave half, said insert having:
  a front face disposed on one side of said one sheave half,
  a rear face disposed on another side of said one sheave half and being angularly disposed with respect to said front face,
  said insert thereby being so constituted and arranged as to completely encompass a substantial portion of said one sheave half axially thereof, radially thereof and completely annularly thereabout,
  said insert further being provided with:
  a bore disposed generally centrally thereof and extending therethrough, said bore having:
  threads positioned interiorly and completely annularly thereof;
  another of said sheave halves comprising,
  a generally centrally disposed planar portion,
  an angular planar portion acutely angularly disposed with respect to said central planar portion and positioned radially outwardly thereof,
  an imperforate curvilinear rib positioned and extending between said planar portions and being integrally connected respectively thereto, a plurality of radially outwardly extending slots extending through said central planar portion and spaced circumferentially thereabout, said slots defining:

tabs therebetween, said tabs extending outwardly of the plane of said central planar portion and being acutely angularly disposed with respect thereto, an insert non-rotatably mutually cooperatively engageable and structurally operatively associated with said other sheave half, said insert having:

a front face disposed on one side of said other sheave half, a rear face disposed on another side of said other sheave half and being acutely angularly disposed with respect thereto, said insert thereby being so constituted and arranged as to completely encompass a substantial portion of said other sheave half axially thereof, radially thereof and completely annularly thereabout, and threads positioned upon said insert and extending completely annularly thereabout, said threads being threadedly mutually cooperatively engageable with the threads of the insert of said one sheave half to enable said plurality of sheave halves to be rotatably and axially movable with respect to each other, said insert for the other sheave half having a bore disposed generally centrally thereof and extending therethrough;

a cylindrically tubular hub positioned within and extending through the aperture of the central planar portion of said one sheave half and being non-rotatably secured thereto;

a shaft positioned within and extending through said hub;

splines positioned interiorly of said hub and exteriorly of said shaft, said splines being mutually cooperatively engageable, to enable said hub and shaft to be disposed in non-rotatable relationship with respect to each other with said one sheave half being disposed in non-rotatable relationship with respect to said shaft;

said hub having a bearing surface extending completely annularly thereabout and substantially like longitudinal dimensional extent thereof;

a generally annular bushing positioned completely annularly about said hub and disposed to be rotatably mutually cooperatively engageable with the bearing surface thereof;

said bushing being positioned within the bore of and being non-rotatably secured to the insert of said other sheave half with said other sheave half being disposed in rotatable relationship with respect to said shaft;

the angular planar portions of each of said one and said other sheave halves defining a V-shaped groove therebetween; and drive means positioned within said groove for transmitting a force to or from said shaft, whereby tension in said drive means is maintained substantially constant by increasing the effective diameter of said pulley apparatus as the sheave halves rotatably and axially move with respect to each other by virtue of the threaded mutual cooperative engagement between the inserts thereof.

2. Self-compensating torque transmitting pulley apparatus comprising, in combination:

a plurality of sheave halves defining the effective diameter of said pulley apparatus;

a hub non-rotatably mutually cooperatively engageable with one of said sheave halves, another of said sheave halves being rotatably mutually cooperatively engageable with said hub to enable said sheave halves to be rotatably movably disposed with respect to each other; and self-compensating means mutually cooperatively engageable and structurally operatively associated with said plurality of sheave halves for varying the effective diameter of said pulley apparatus, said compensating means being so constituted and arranged as to dispose said plurality of sheave halves in axial movable relationship with respect to one another and to encompass a substantial portion of said sheave halves axially thereof, generally radially thereof and substantially annularly thereabout.

3. In the apparatus as defined in claim 2, wherein:

said self-compensating means comprises:

one insert mutually cooperatively engageable and structurally operatively associated with one of said sheave halves, and another insert mutually cooperatively engageable and structurally operatively associated with another of said sheave halves, each of said inserts having a portion disposed on one side and a portion disposed on another side of a corresponding one of said plurality of sheave halves and extending therebetween.

4. In the apparatus as defined in claim 3, wherein:

one of said inserts is exteriorly threaded, and the other of said inserts is interiorly threaded, the threads of each of the inserts being disposed radially outwardly of the hub and being threadedly mutually cooperatively engageable for axially moving the sheave halves with respect to each other and varying the effective diameter of said pulley apparatus upon relative rotation between said sheave halves.

5. In the apparatus as defined in claim 4, wherein:

said inserts are comprised of a molded plasticized material.

6. In the apparatus as defined in claim 2, therein:

each of said sheave halves comprises:

slots extending therethrough and spaced annularly thereabout; and said self-compensating means comprises:

one insert mutually cooperatively engageable and structurally operatively associated with one of said sheave halves, and another insert mutually cooperatively engageable and structurally operatively associated with another of said sheave halves, each of said inserts having a front face disposed on one side and a rear face disposed on another side of a corresponding one of said sheave halves, said inserts extending between the front and rear faces thereof and through the slots of said sheave halves.

7. In the apparatus as defined in claim 6, wherein:

one of said sheave halves comprises:

tabs defined between the slots thereof, said tabs extend-disposed with respect thereto.

ing outwardly of said sheave half and being angularly

8. In the apparatus as defined in claim 7, wherein:

one of said inserts is exteriorly threaded, and the other of said inserts is interiorly threaded, the threads of each of the inserts being disposed radially outwardly of the hub and being threadedly mutually cooperatively engageable for axially moving the sheave halves with respect to one another and varying the effective diameter of said pulley apparatus upon relative rotation between said sheave halves.

9. In the apparatus as defined in claim 8, wherein:

said inserts are comprised of a molded plasticized material.

10. Self-compensating torque transmitting pulley apparatus comprising, in combination:

a plurality of sheave halves defining the effective diameter of said pulley apparatus;

a hub non-rotatably mutually cooperatively engageable with one of said sheave halves, another of said sheave halves being rotatably mutually cooperatively engageable with said hub to enable said sheave halves to be rotatably movably disposed with respect to each other;

each of said sheave halves having slots extending therethrough and spaced annularly thereabout; and self-compensating means mutually cooperatively engageable and structurally operatively associated with said plurality of sheave halves for varying the effective diameter of said pulley apparatus, said self-compensating means comprising, one insert mutually cooperatively engageable and structurally operatively associated with one of said sheave halves, and another insert mutually cooperatively engageable and structurally operatively associated with another of said sheave halves;

each of said inserts having a front portion disposed on one side, a rear portion disposed on another side of a corresponding one of said plurality of sheave halves, and a portion extending between said front and rear portions and through the slots thereof, said inserts encompassing a substantial part of the respective sheave halves axially thereof, radially thereof and annularly thereabout;

one of said inserts being interiorly threaded, and another of said inserts being exteriorly threaded;

the threads of each of the inserts being disposed radially outwardly of the hub and being threadedly mutually cooperatively engageable for disposing said plurality of sheave halves in axial movable relationship with respect to each other, whereby relative rotation of said sheave halves with respect to each other presents axial movement therebetween thereby varying the effective diameter of said pulley apparatus.

11. In the apparatus as defined in claim 10, wherein:

one of said sheave halves comprises:

tabs defined between the slots thereof, said tabs extending outwardly of said sheave half and being angularly disposed with respect thereto.

12. In the apparatus as defined in claim 11, wherein:

said inserts are comprised of a molded plasticized material.

No references cited.

DON A. WAITE, *Primary Examiner*.

UNITED STATES PATENT OFFICE
CERTIFICATE OF CORRECTION

Patent No. 3,196,702                                  July 27, 1965

Edward T. Getz et al.

It is hereby certified that error appears in the above numbered patent requiring correction and that the said Letters Patent should read as corrected below.

Column 2, line 26, after "invention" insert -- and --; column 6, line 15, for "transmiting" read -- transmitting --; column 8, line 54, strike out "ing outwardly of said sheave half and being angularly", and insert the same after "extend-" in line 52, same column 8.

Signed and sealed this 15th day of February 1966.

(SEAL)
Attest:

ERNEST W. SWIDER                                  EDWARD J. BRENNER
Attesting Officer                                       Commissioner of Patents